United States Patent
Turgeman

(10) Patent No.: US 9,531,701 B2
(45) Date of Patent: *Dec. 27, 2016

(54) METHOD, DEVICE, AND SYSTEM OF DIFFERENTIATING AMONG USERS BASED ON RESPONSES TO INTERFERENCES

(71) Applicant: BioCatch Ltd., Tel Aviv (IL)

(72) Inventor: Avi Turgeman, Cambridge, MA (US)

(73) Assignee: BioCatch Ltd., Tel Aviv (IL)

( * ) Notice: Subject to any disclaimer, the term of this patent is extended or adjusted under 35 U.S.C. 154(b) by 42 days.

This patent is subject to a terminal disclaimer.

(21) Appl. No.: 14/718,096

(22) Filed: May 21, 2015

(65) Prior Publication Data

US 2015/0256528 A1 Sep. 10, 2015

Related U.S. Application Data

(63) Continuation-in-part of application No. 13/877,676, filed as application No. PCT/IL2011/000907 on Nov. 29, 2011, now Pat. No. 9,069,942, application No. 14/718,096, which is a continuation-in-part of application No. PCT/IB2014/062941, filed on Jul. 8, 2014, application No. 14/718,096, which is a continuation-in-part of application No. 14/675,768, filed on Apr. 1, 2015, now Pat. No. 9,418,221.

(Continued)

(51) Int. Cl.
*G06F 21/00* (2013.01)
*H04L 29/06* (2006.01)
*H04L 29/08* (2006.01)
*G06F 7/04* (2006.01)
*G06F 15/16* (2006.01)
*G06F 17/30* (2006.01)

(52) U.S. Cl.
CPC ............... *H04L 63/08* (2013.01); *H04L 67/22* (2013.01); *H04L 63/1416* (2013.01)

(58) Field of Classification Search
None
See application file for complete search history.

(56) References Cited

U.S. PATENT DOCUMENTS

| | | | |
|---|---|---|---|
| 7,796,013 B2* | 9/2010 | Murakami | G06F 21/32 340/5.52 |
| 2002/0089412 A1* | 7/2002 | Heger | G06F 3/017 340/5.82 |

(Continued)

*Primary Examiner* — Shin-Hon Chen
(74) *Attorney, Agent, or Firm* — Eitan, Mehulal & Sadot

(57) ABSTRACT

Devices, systems, and methods of detecting user identity, differentiating between users of a computerized service, and detecting a cyber-attacker. An end-user device interacts and communicates with a server of a computerized service, or with a local application or Web-browser running on the end-user device. A usage interference is injected or introduced, or an input/output mismatch or abnormality is created, causing an output displayed on the screen of the end-user device, to be non-matching to the expected or intended output that is typically displayed in response to regular non-interfered user gestures or regular non-interfered user input. The reaction or corrective manual actions of the user are tracked and analyzed, to differentiate among users, or to differentiate between an authorized human user and a human cyber-attacker, or to differentiate between an authorized human user and a computer bot or an automated computerized script.

25 Claims, 5 Drawing Sheets

Related U.S. Application Data

(60) Provisional application No. 61/417,479, filed on Nov. 29, 2010, provisional application No. 61/843,915, filed on Jul. 9, 2013, provisional application No. 61/973,855, filed on Apr. 2, 2014.

(56) References Cited

U.S. PATENT DOCUMENTS

| | | | |
|---|---|---|---|
| 2004/0062423 A1* | 4/2004 | Doi | G06F 21/32 382/118 |
| 2005/0008148 A1* | 1/2005 | Jacobson | G06F 3/038 380/26 |
| 2006/0284969 A1* | 12/2006 | Kim | G06F 21/316 348/14.01 |
| 2007/0183633 A1* | 8/2007 | Hoffmann | G06K 9/00221 382/116 |
| 2009/0189736 A1* | 7/2009 | Hayashi | G06F 21/32 340/5.81 |
| 2009/0293119 A1* | 11/2009 | Jonsson | G06F 21/36 726/19 |
| 2009/0320123 A1* | 12/2009 | Yu | G06F 21/316 726/16 |
| 2010/0281539 A1* | 11/2010 | Burns | H04L 63/1441 726/23 |

\* cited by examiner

METHOD, DEVICE, AND SYSTEM OF DIFFERENTIATING AMONG USERS BASED ON RESPONSES TO INTERFERENCES

CROSS-REFERENCE TO RELATED APPLICATIONS

This application is a Continuation-in-Part (CIP) of, and claims priority and benefit from, U.S. patent application Ser. No. 13/877,676, filed on Apr. 4, 2013; which is a National Stage of PCT International Application number PCT/IL2011/000907, having an International Filing Date of Nov. 29, 2011; which claims priority and benefit from U.S. provisional patent application No. 61/417,479, filed on Nov. 29, 2010; all of which are hereby incorporated by reference in their entirety.

This application is a Continuation-in-Part of, and claims priority and benefit from, PCT International Application number PCT/IB2014/062941, titled "Device, System, and Method of Differentiating Among Users of a Computerized Service", having an International Filing Date of Jul. 8, 2014; which claims priority and benefit from U.S. provisional patent application No. 61/843,915, filed on Jul. 9, 2013; all of which are hereby incorporated by reference in their entirety.

This application is a Continuation-in-Part of, and claims priority and benefit from, U.S. patent application Ser. No. 14/675,768, titled "Method, Device, and System of Differentiating Among Users based on Responses to Injected Interferences", filed on Apr. 1, 2015; which claims priority and benefit from U.S. provisional patent application No. 61/973,855, titled "Method, Device, and System of Detecting Identity of a User of an Electronic Service", filed on Apr. 2, 2014; all of which are hereby incorporated by reference in their entirety.

FIELD

The present invention is related to the security of electronic devices and systems.

BACKGROUND

Millions of people utilize mobile and non-mobile electronic devices, such as smartphones, tablets, laptop computers and desktop computers, in order to perform various activities. Such activities may include, for example, browsing the Internet, sending and receiving electronic mail (email) messages, taking photographs and videos, engaging in a video conference or a chat session, playing games, or the like.

Some activities may be privileged, or may require authentication of the user in order to ensure that only an authorized user engages in the activity. For example, a user may be required to enter a username and a password in order to access an email account, or in order to access an online banking interface or website.

SUMMARY

The present invention may include, for example, systems, devices, and methods for detecting identity of a user of an electronic device; for determining whether or not an electronic device is being used by a fraudulent user or by a legitimate user; and/or for differentiating among users of a computerized service or among users of an electronic device.

Some embodiments of the present invention may comprise devices, systems, and methods of detecting user identity, differentiating between users of a computerized service, and detecting a possible attacker.

The present invention may provide other and/or additional benefits or advantages.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements or components. The figures are listed below.

DETAILED DESCRIPTION OF THE PRESENT INVENTION

Figure 1A:
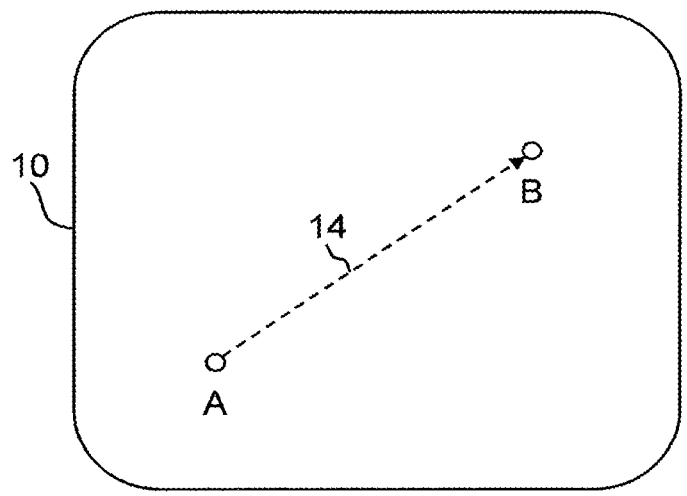
FIG. 1A is a schematic illustration demonstrating a path of on-screen cursor movement or on-screen pointer movement on a display visible to an end-user of a computer or other electronic device, in accordance with some demonstrative embodiments of the present invention.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Applicant has realized that elaborate schemes have been devised to maintain security during interactive sessions between an end-user and a computer. Previously, a simple requirement for a single password sufficed, but malicious intrusions, by parties sometimes referred to as "hackers", resumed after such hackers were able to develop methods to bypass simple password requirements. End-users are now typically advised, and sometimes even required, to compose personal passwords of a random or semi-random nature, such as having at least one capital letter and one lower-case letter, at least one numeral, and a special character (e.g., "!", "@", "$", and "#"). End-users are often asked to change their passwords occasionally, for example, every three months.

Applicant has realized that intruders have found ways to by-pass passwords, even those of a random nature, so other protections schemes have been developed, such as those requiring biometric data. One example of such scheme employs a fingerprint reader, so an end-user desiring to conduct an interactive session must supply the fingerprint that is associated with a particular account. However, even biometric data can be stolen and then used to gain unauthorized access to protected data.

Applicant has realized that another growing problem is the use of "bots" (computer programs that run automatically) to bypass user authentication schemes. There is a need for a way to distinguish between bots and humans attempting to begin an interactive session with a computer.

Applicant has realized that another method to confirm user identity is to implement transparent continuous authentication (TCA). TCA operates continuously during the whole user session in order to authenticate users according to their behavior or biometric behavior, for example, according to voice. This type of TCA may monitor a speaker's voice during an entire conversation with a call center.

Applicant has realized that a problem with conventional TCA is that the learning and detecting process for user confirmation is very long. Unlike requesting a password and waiting for a user response, TCA does not have standard requests that produce expected responses from authorized users and unexpected responses from unauthorized users. By not prompting particular responses, the validation method necessarily must take longer due to the need to wait for distinguishable behavior from users for confirmation.

Applicant has realized that two common categories of solutions became known as "log-in authentication" and "continuous authentication," the former being more common.

Applicant has realized that log-in authentication involves the transfer of "secrets" during an interactive process, such as, login-in, using USB encryption keys, and biometric authentication (fingerprint, voice, pictures, and even keystrokes and mouse dynamics). This type of authentication could be defeated by unauthorized acquisition of the secrets, such as by phishing or planning Trojan horses.

Applicant has realized that continuous authentication, also known as "transparent continuous authentication" (TCA) involves the collecting of information in the background throughout a user session, and this form of authentication could detect an unauthorized user after his/her credentials were already stolen. Applying this transparent method, a user would not be aware that his actions are being scrutinized (unlike the awareness, for example, of being asked to provide a password). Examples of TCA include voice recognition, mouse dynamic recognition, and keystroke analysis. The drawback of this method is that the transparent process is by definition not an interactive process, so by not "involving" the user the authentication process last longer. Thus, the user had more freedom to conduct various activities before the authentication was complete. From the perspective of the protection provides, the session is considered pseudo-random, uncontrolled, unsupervised, and unpredictable.

The present invention provides embodiments that authenticate end-users either while attempting to begin interactive sessions with computer or throughout user sessions to determine whether the users are authorized to use the identities they provide. The embodiments can also distinguish between human users and bots. Further, embodiments can determine if one user has created multiple identities.

Embodiments of the present invention include motor control TCA, which was developed to prove the significance of current TCA solution dealing with keyboard and mouse dynamic. The concept implements theory taken from the field of mechanical robotics to imitate human movements by modeling the motor control as a complex system. A feedback loop facilitates the flow of signals among the eyes, the brain, and muscles.

Another embodiment of the present invention is interactive transparent continuous authentication, which actually implements transparent continuous authentication in the background of a user session without the user being aware of the authentication process but nonetheless staying involved. Such is achieved by causing interferences (aberration) during user sessions so the users will respond but will not be aware that a test was in progress. This solution controls the session and is more predictable than "normal" TCA despite being transparent.

A further embodiment of the present invention is interactive TCA. Such also provides protection against bots and Trojan horses. These automated intruders do always respond to interferences (aberrations) as human users do, and interactive TCA exploits that deficiency as discussed below.

The present invention may comprise a method of confirming the identity of an end-user operating a computer. The method includes: causing an aberration in output that the computer provides to an output device; receiving a response to the aberration; extracting from the response an end-user characteristic; and comparing the extracted end-user characteristic response with stored characteristic responses to find a similarity of the end-user's response to a stored response; wherein a similarity is indicative of the identity of the computer user.

The present invention may comprise a method of confirming the identity of an end-user operating a computer. More specifically, the method includes: causing an aberration in output that the computer provides to an output device; determining whether the end-user responds differently to the output than if the output did not have the aberration; and interpreting the lack of a different response as indicative that the end-user is a bot.

The present invention may comprise a device or a system for confirming the identity of an end-user operating a computer. The device or system has a processor and a memory. The memory holds instructions that, when executed by the processor, cause the processor to: cause an aberration in output that the computer provides to an output device; receive a response to the aberration; extract from the response an end-user characteristic; and compare the extracted end-user characteristic response with stored characteristic responses to find a similarity of the end-user's response to a stored response. A similarity is indicative of the identity of the end-user.

The present invention may comprise a device or system for confirming the identity of an end-user operating a computer. The device or system has a processor and a memory. The memory holds instructions that, when executed by the processor, cause the device to: cause an aberration in output that the computer provides to an output device; determine whether the end-user responds differently to the output than if the output did not have the aberration; and interpret the lack of a different response as indicative that the end-user is a bot.

Applicant has realized that human physiological features differ from one person to the next, and knowledge of such differences can be exploited to identify a computer end-user or a user of an electronic device such as tablet or smartphone or smart-watch ("user"), based on how he/she uses the computer or the device. This identification is made possible by observing characteristic responses of a user to unexpected output when using the computer or electronic device.

Figure 1B:
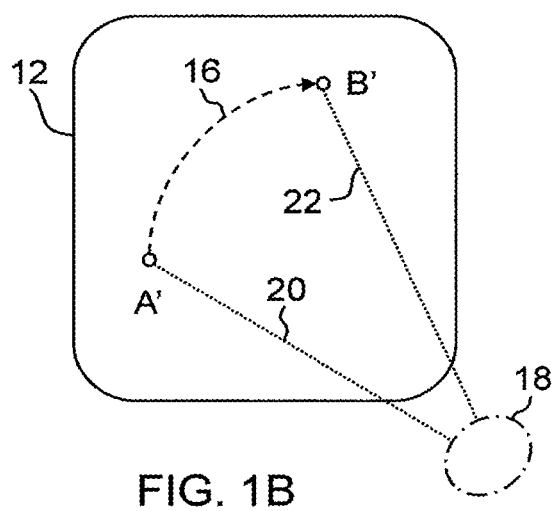
FIG. 1B is a schematic illustration demonstrating mouse movement on a mouse pad or other input unit, to control the on-screen cursor movement or on-screen pointer movement of a computer or other electronic device, in accordance with some demonstrative embodiments of the present invention.

As an example, consider a computer operatively connected to the display 10 of FIG. 1A and to a mouse (not shown for clarity) that a user slides along the mouse pad 12 of FIG. 1B as is known in the art to alter the position of a mouse cursor (also not shown for clarity) displayed in the image on the display 10. The mouse cursor in this example is initially located at point A, and the user wants to reposition the cursor to point B. To effect such change in position, the user grasps with his hand the mouse, located at point A' on the mouse pad 12, and slides it to point B'.

The change in cursor position on the display 10 is represented by the straight line 14 in FIG. 1A, and the user may think of the associated motion as linear or more likely not even think consciously about the shape of the mouse's path at all. In this example, the shape of mouse's path 16 is curved, as shown in FIG. 1B for the following reason: the user rests his elbow or on a prominent forearm muscle near the elbow on a region 18 of a stationary surface, such as a desktop or a chair armrest, to act as a pivot point for the forearm as the forearm moves from position 20 to position 22 to change the mouse location. Although the mouse's path 16 is represented as an arc of a circle in FIG. 1B, more often the shape of such path is more complex, because the locations of the points A' and B' and the region 18 and length of the user's forearm are unlikely to be such that the user can move the mouse as needed by only a simple pivoting of the forearm. It may be necessary to flex and/or extend the forearm muscles and perhaps also to move or remove the pivot point.

The exact motion of the mouse's path 16 on the mouse pad 12 affects the shape of the cursor's path on the display 10, and the shape of the cursors path will usually differ from one user to the next due to differing physiological features, such as the length of the users' forearms and muscle characteristics. With sufficient tracking and recording of user characteristics that are associated with how users move mouse cursors, it is possible to identify users in the future based on past observations.

The length of the users' forearms and their muscle characteristics are only two of many physiological features that relate to trackable characteristics suitable for user identification. Additional examples of trackable characteristics include visual reaction times, internal jitter noises, muscle dexterity and control, and nervous and muscular systems reaction times. Monitoring and analyzing such physiological features for the purpose of user identification can be referred to as "motor control based transparent continuous authentication (TCA)."

In accordance with the present invention, another procedure for user identification may be referred to as "motor control based interactive transparent continuous authentication." This procedure uses an algorithm to interfere with the visual display that the user sees to cause an aberration to appear in the output. The aberration can be subtle enough so that the user does not sense any mechanism attempting to confirm his/her identity. For example, if the user moves the mouse from point A' to point B' on the mouse pad 12, the procedure will prevent the cursor from moving exactly to point B on the display 10. Perhaps instead the cursor will be a little higher or to the right of point B. The user probably does not know that the interference was added by the interactive TCA algorithm during the user session. Instead, the user probably just thinks that he did not move the mouse to the appropriate position to cause the cursor to appear where he intended.

Aberrations may fall into one of two categories: continuous and local. A continuous aberration is not consciously sensed by the user. Over time, the user becomes accustomed to the conditions of the aberration, and his/her body adapts accordingly. Force field and distortion effects on cursors are examples of such conditions. Users do sense local aberrations, but they do not realize that the aberrations are caused just for the purpose of distorting output, as the types of aberrations resemble typical web experiences, such as that of a mouse cursor disappearing. With either continuous or local aberrations, a user's adaptation thereto is indicative of identity.

In all likelihood, the user will compensate for the aberration in output, and the specific compensating motions are the user's "characteristic response" that can be used for user identification. For example, one user may not compensate for the motion until he has moved the mouse to point B' and then noticed that the cursor was not displayed at point B. Then, he will move the mouse appropriately in a new attempt to bring the cursor to point B. Another user my notice the aberration significantly before the curser gets far for point A, and then she will start her compensation earlier. Of course, by initially tracking a greater number of responses to aberrations, the results later for user identification can become more significant. Also, by causing output aberrations under the motor control interactive TCA procedure, instead of merely collecting responses to unplanned conditions using the motor control based TCA, more controlled conditions are available for more significant and quicker user identification.

The present invention may be embodied as a method of confirming the identity of an end-user operating a computer. A server interfacing with a computer via a local area network (LAN) or the Internet may be programmed to perform this method. Alternatively, the method may be performed on the same computer for which its user's identity is being confirmed. The user may be operating the computer in a home or office setting. The user may instead be in a more public area, such as a bank, and using a computer commonly used by many other users in the same day.

Figure 2:
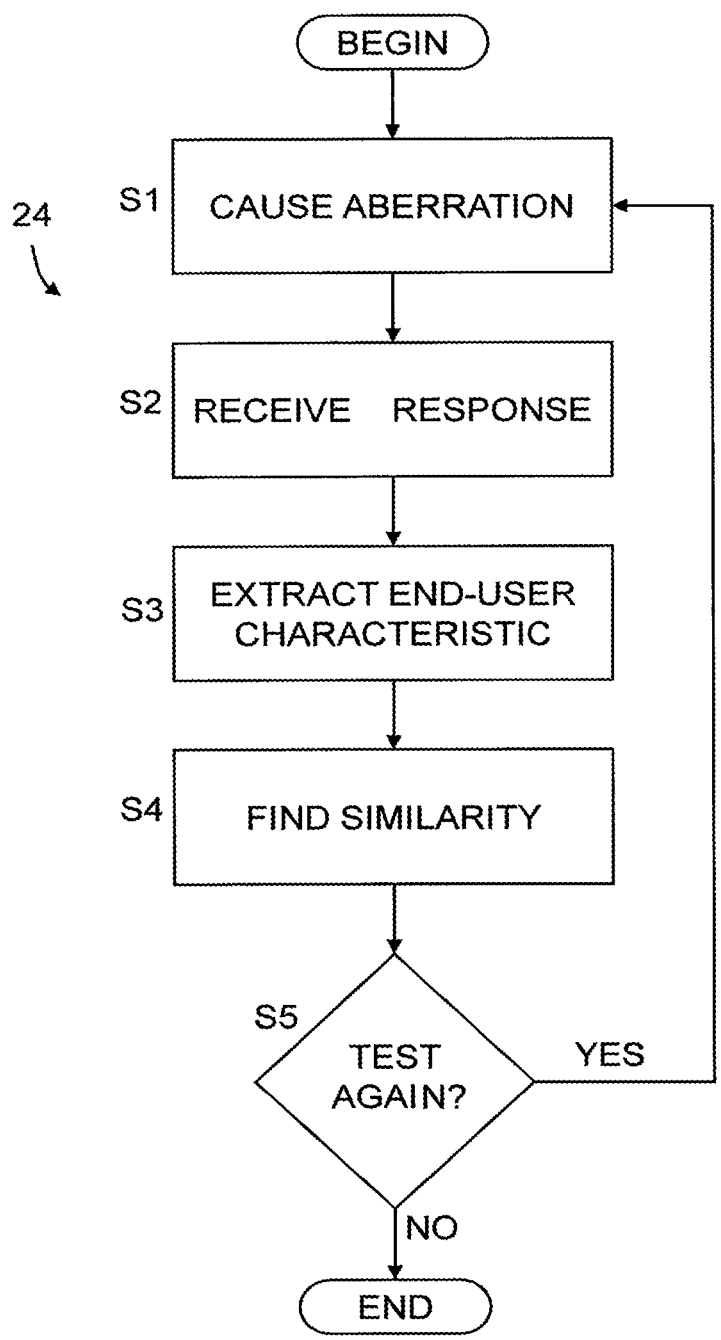
FIG. 2 is a flowchart representing a method of confirming the identity of an end-user operating a computer or other electronic device, in accordance with some demonstrative embodiments of the present invention.

With reference to the flowchart 24 shown in FIG. 2, this method begins by causing an aberration in output that the computer provides to an output device. (Step S1.) The output device may be a display for human use, such as the display 10 of FIG. 1A. The aberration may be caused by a software module, such as JavaScript or flash, in the computer's web browser acting according to instructions from an external server or within the computer.

It is recognized that a bot attempting to operate the computer will not need the same type of output device, for example, a visual display that a human would use. Nonetheless, the bot and its associated computer system implement an analogous type of output device to appear as a user (to "emulate" the user) to the server or other mechanism that is executing the present process of determining whether to confirm the user's identity. Instead of a standard "human" display, the bot may use instead an "emulated display" to receive output in way that attempts to appear as a human display.

As discussed earlier, the aberration of step S1 may be a diverted movement of a cursor on a display. If a bot associated with an emulated display is operating the computer, then the aberration may analogously be a diverted movement on an emulated display. The cursor movement may be diverted by changing the ratio of the angle and/or magnitude of cursor movement that the cursor movement device (or an emulated cursor movement device) specifies to the angle and/or magnitude of the movement of the cursor on the display (or on the emulated display). Types of cursor movement devices include a mouse, a trackball, a touch pad, a natural user interface (NUI) controlled for example by voice or body movement, and the like.

In some instances, cursor movement may be controlled by a user using a device having a touch-screen display. The user's specific compensating motions upon the touch-screen are then measured to determine the user's "characteristic response" for user identification. In use of the method of the invention with a touch-screen display, the "cursor movement device" is defined as the touch-screen and its associated software for controlling cursor movement.

An emulated cursor movement device is the mechanism that a bot may use to communicate to the server or other mechanism executing the present method as if a genuine cursor movement device were being used. That is, the emulated cursor movement device sends signals to appear as if a human is operating the computer.

Other types of aberrations are within the scope of step S1. For example, the aberration can be the disappearance from the display of the cursor that is moved according to signals from of the cursor movement device (as opposed to a keyboard cursor, that is, the cursor that moves in response to characters entered via a keyboard). If the computer is being operated by a bot, then the disappearance would be that of the emulated cursor that moves according to signals from an emulated cursor movement device.

Another kind of aberration to use when the output device is a display (or an emulated display) is the disappearance of the keyboard cursor from the display (or the disappearance of a bot's emulated keyboard cursor from an emulated display). Some users might respond by pressing their keyboards' cursor movement keys. Other might respond by positioning their mouse cursor where they want the keyboard cursor to appear. The specifics of different responses can be used later for user identification, as discussed in more detail below.

An additional kind of aberration is the display of a character that differs from a character that a user specified using his/her keyboard (or that a bot specified using an emulated keyboard). Some users may respond quickly by pressing their keyboard's backspace key. Others may not notice the mistake immediately, especially if they do not typically view the display when typing characters. (They may focus their attention instead on documents.) When they do notice the mistakes, some may delete unwanted characters using the "backspace" key while others respond using the "delete" key. Also, programming common misspellings as aberrations differentiates users by how well they notice the misspellings.

Other types of aberrations become available when another peripheral is used the output device for this method. For example, if the output device is an audio speaker, an aberration could be an increase in volume, either by a small or a large amount (with the intention of seeing whether the user reduces the volume quickly, slowly, or not at all, or whether the user turns the sound off completely).

The preceding discussion of aberrations caused in step S1 is by no means an exhaustive list. Many other types of aberrations are suitable. The goal is to cause the user to respond in such a way to provide information useful for identifying him/her, as discussed in the following:

After the step S1 of causing the aberration, the next step is receiving a response to the aberration. (Step S2.) For example, if the aberration of step S1 was the disappearance or diverted movement of a cursor from the computer's display (or the disappearance or diverted movement of an emulated cursor from an emulated display), the response received in step S2 may be that relating to the cursor movement device (or the emulated cursor movement device) associated with the computer. As one example of the performance of Step S2, if a server is configured to perform the present method, step S2 may be performed by the server receiving the response from the computer operated by the end-user whose identity is to be confirmed. Such may be effected by client-side software, such as JavaScript or flash, installed on the computer's browser to collect raw data relating to the user response and to forward it to the server. The system may be such that the server receives the response from the computer through a LAN or the Internet. The server may instead have a direct connection to the computer, such as by a USB cable or wireless connection. (This latter system can be considered a network of two computers.) Alternatively, this method can be performed on an end-user's computer, so there is no separate server or network. Computer software may be implemented to collect raw data, as in the server example, but the data are transferred internal to the computer for receipt.

After the step S2 of receiving the response to the aberration, the next step is extracting from the response an end-user characteristic. (Step S3.) One way to extract the end-user characteristics is to analyze the raw data collected from in the client side as discussed above, extracting movement features and building a model for each user accordingly. Cross-movement features could also be extracted to enhance model accuracy. Moreover, movement could be characterized by a tag which indicates its type (for example, left/right movement). This tagging could both effected as part of the user model and also in order to create sub-models per tag type. A user's model may be based on supervised learning techniques, which treat other user data as a sample of possible adversaries and thus infer what are the features which are most relevant to detect the current user out of the entire population of users. Alternatively or additionally, a statistical model could be built for each user independently of models for other users. One example algorithm for this is a support vector machine (SVM), which analyzes data and recognizes patterns, and there are other such methods in the field of classification and machine learning.

After the step S3 of building an end-user model from the user's (bot's) response, the next step is to find a similarity of the end-user's response to a stored response. (Step S4.) Accordingly, there is a comparison of the extracted end-user characteristic with the stored responses of that user and with responses of other stored user models that are potential intruders. In each session, the user gets a score value that indicates how much the characteristics are similar to those in the model built in a previous learning process. This score can be accompanied by a certainty level that is based on a self assessment of the model to determine its accuracy. The score and accuracy could possibly be a combined value of both. Moreover, scores from different times or of different types could be integrated to improve classification performance.

A similarity of the end-user's response to a stored response is indicative of the identity of the computer user. In some implementations, though, it may be difficult to obtain enough identifying information from the only one response to an aberration, and repeating the above process can increase accuracy and accelerate the user identification process. Accordingly, it can be desirable to repeat the causing of an aberration (step S1), the receiving of the response (step S2), the extracting of an end-user characteristic (step S3), and the comparing of the end-user characteristic response with stored characteristic responses (step S4). Accordingly, it is queried whether to run the test cycle again (step S5), and if another cycle is to be performed the process flow returns to step S1 as shown in FIG. 2. For example, it may be desired to repeat the test cycle every time a repeated predetermined time period ends. If the test cycle is not to be run again, the process ends at this point.

A user's response and his extracted end-user characteristics to an aberration, may be plotted by the software of the invention, to determine the user's learning curve over time. During any specific session, several aberrations may appear, and a single human user will correct more rapidly to the aberration as the session progresses (while a bot will not). Additionally, the learning curve of a human user will be more rapid over several sessions than that of either an intruder, unfamiliar with the aberration, or of a bot. The learning curve of the identified (authentic) user will have additional measurable parameters useful for extracting end-user characteristics that may be utilized for identification of the user. Examples of additional measurable parameters of a user's learning curve include: the time a user takes to identify an aberration and the time he takes to correct for it; the continuity of the correction for the aberration; mistakes in correcting for the aberration; noises in correcting the aberration; parameters that define the level of control the user has over the output device (in spite of the aberration) such as parameters of the efficiency of cursor movement in respect to the desired user response.

Embodiments of the present inventors address the situation in which a bot, programmed to emulate an end-user, may fail to "notice" an aberration in output provided to an output device. For example, if the bot is programmed to enter "john.smith" in a user name field, and the display (or emulated display) shows "joh.ith," the bot may have no functionality to check whether "john.smith" indeed appeared as expected. The bot would simply proceed as programmed, such as, by entering a password in a password field. A human user, whether an authorized user or another human acting as if he were an authorized user, would likely respond to the display of "joh.ith" by adding the missing letters "n," "s," and "m" where appropriate.

That is, a human user would most likely respond to an aberration in output differently than if the output did not have the aberration. In contrast, a bot of lesser sophistication might not respond differently at all to the aberration. Thus, the lack of different response to the output with the aberration from the response to the output that did not have the aberration is an indication that the end-user is likely a bot. Thus, the present invention may be embodied as a method of confirming the identity of an end-user operating a computer, the method being particularly suitable for determining whether the end-user is a bot.

Figure 3:
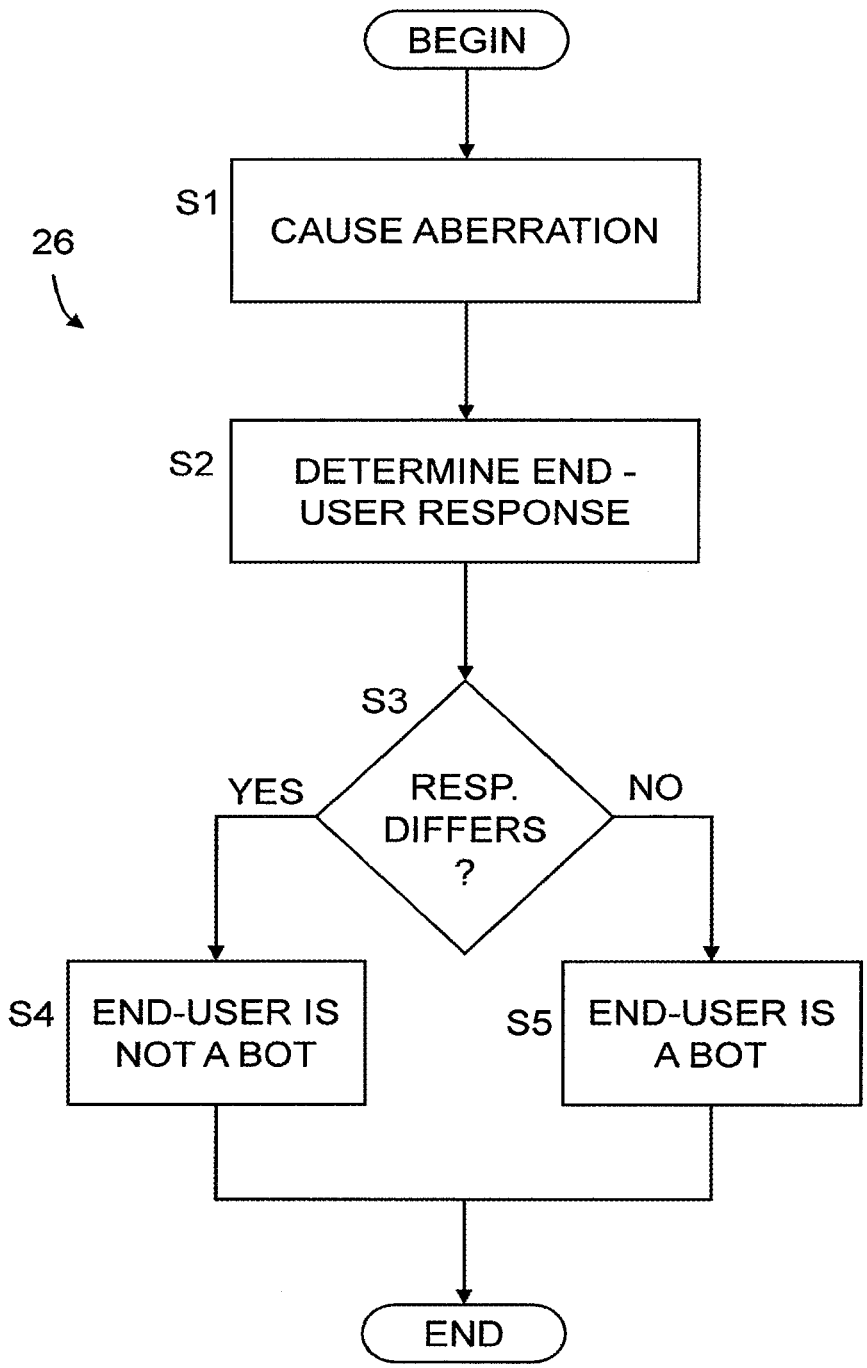
FIG. 3 is a flowchart representing another method of confirming the identity of an end-user operating a computer or other electronic device, in accordance with some demonstrative embodiments of the present invention.

With reference to the flowchart 26 shown in FIG. 3, this method begins by causing an aberration in output that the computer provides to an output device. (Step S1.) Such step may be executed analogously to how step S1 of the previous embodiment described above (and in FIG. 2) is executed.

After the step S1 of causing the aberration, the next step is determining whether the end-user responds differently to the output than if the output did not have the aberration. (Step S2.) With reference to the example above, if a server or other mechanism were executing the present method, client-side software, such as JavaScript or flash, may be implemented in the computer's browser to collect any cursor movements and keystrokes of a user's response. For example, server could cause the display of "joh.ith" in a user name field after the human user or bot entered "john. smith" and then determine whether the user (or bot) attempts to add the missing "n," "s," and "m." It is assumed in this example that a human user would attempt to add the missing letters.

It is then queried whether the result of the step S2 determination is that the end-user, whether human or a bot, responded differently to the output with the aberration than if the output did not have the aberration. (Step S3.) If the result is affirmative, it is interpreted that the end-user is not a bot. (Step S4.) If instead the result is negative, it is interpreted that the end-user is a bot. (Step S5.) The process then ends.

The preceding discussions explain how the invention may be embodied to detect a bot or an unauthorized human trying to gain access to protected information as if the bot or unauthorized human were the authorized user. However, the invention can also be embodied to detect whether a single human user is acting as multiple users, for example, by having multiple user accounts. A single human user has limited control of his/her characteristic responses, so embodiments of the invention may be used to detect a single user associate with multiple user accounts under the guise of multiple users.

Figure 4:
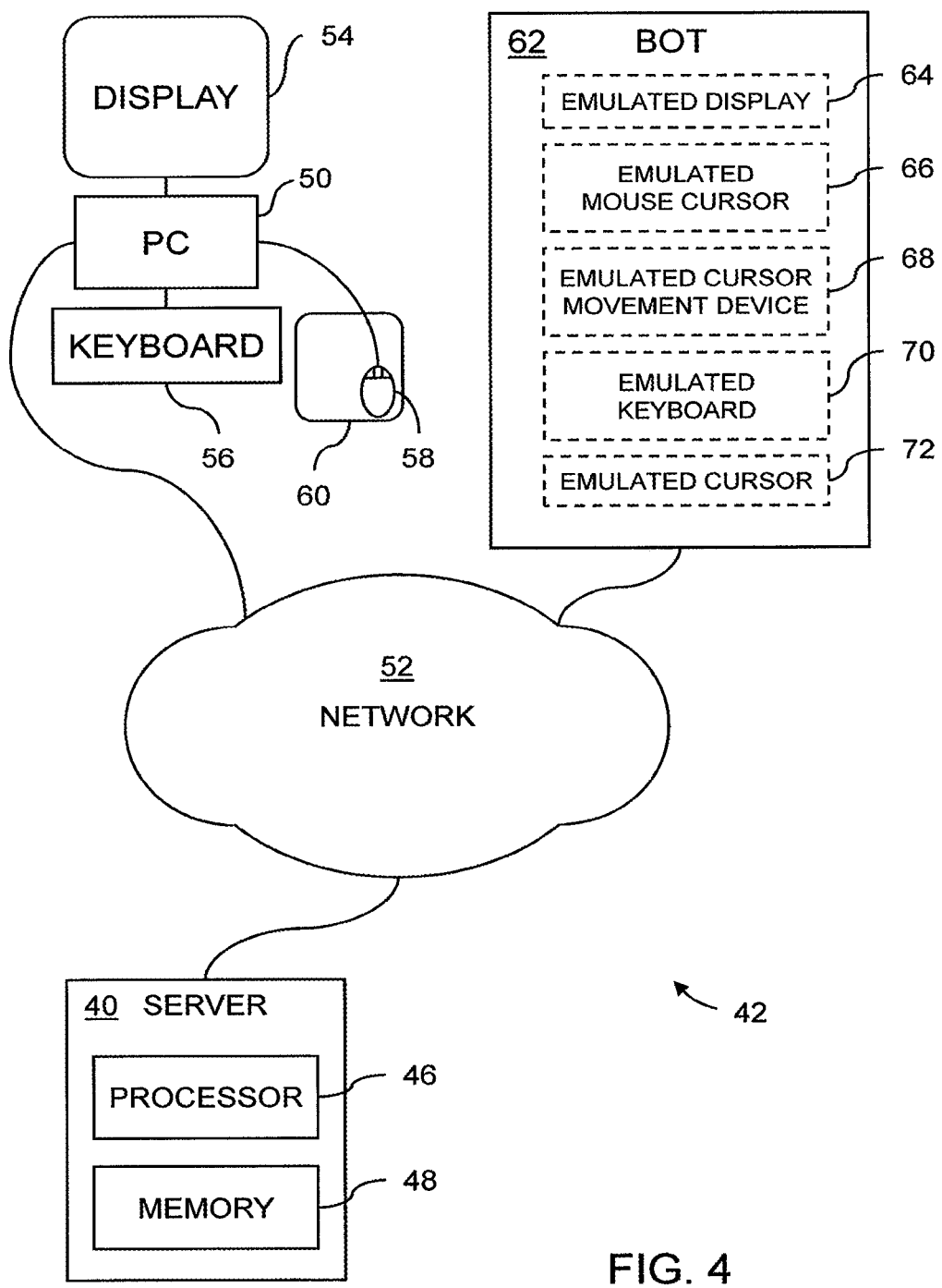
FIG. 4 is a schematic illustration of a system for confirming the identity of an end-user operating a computer or other electronic device, in accordance with some demonstrative embodiments of the present invention.
Figure 5:
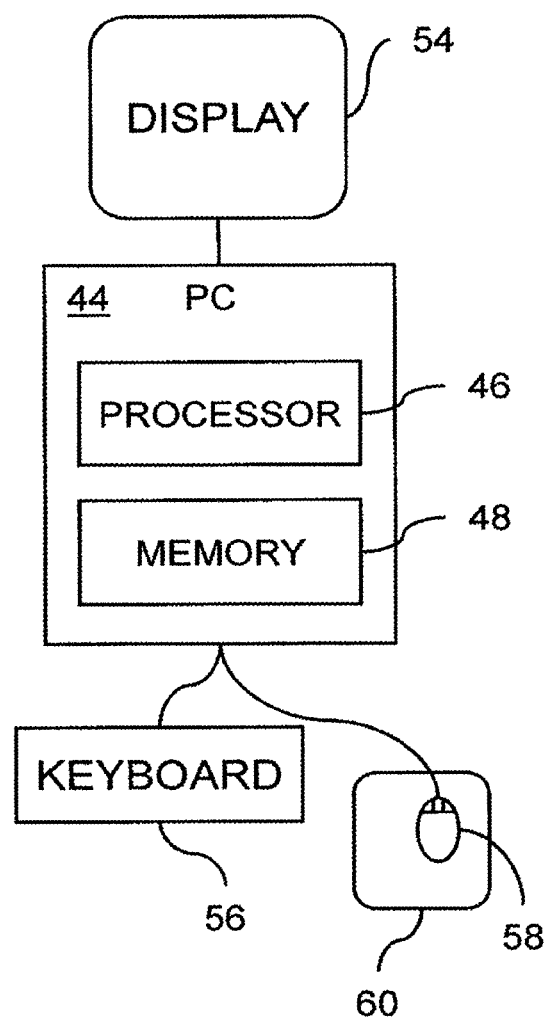
FIG. 5 is a schematic illustration of another system for confirming the identity of an end-user operating a computer or other electronic device, in accordance with some demonstrative embodiments of the present invention.

The invention may also be embodied as a device for confirming the identity of an end-user operating a computer. The device may be a server 40, illustrated as part of the system 42 of FIG. 4, or a "stand alone" computer, such as the personal computer 44 illustrated in FIG. 5. Alternatively, the device may be another type of computing device, such as a smart phone or a tablet, as non-limiting examples. In both the implementations of FIG. 4 and of FIG. 5, the device has a processor 46 and a memory 48. The processor 46 may be an Intel Pentium Processor E5400, an Intel Xeon 5130 CPU, or any other equivalent means for processing (executing) instructions held in the memory 48. The memory 48 may be a SATA hard drive, a flash memory SSD, or any other equivalent means for storing instructions that when executed by the processor 46 cause the processor 46 to function as described herein. The memory 48 may also be an external USB flash drive. In the configuration of FIG. 5, the end-user interfaces directly with the device of the present embodiment, the personal computer 44. In the system of FIG. 4, the end-user uses a personal computer 50 to interface with the device, the server 40, through a network 52. The network 52 may be a LAN or the Internet.

As shown in FIG. 4, the personal computer 50 has operationally connected thereto a display 54, a keyboard 56, and a mouse 58 on a mouse pad 60. In alternate embodiments, a different cursor movement device may be used instead in place of the mouse 58. An end-user may to access the server 40 so its processor 46 data would process data or to view records stored in the memory 48. For example, the server 40 may be administered by a bank, and the end-user may want to use the processor 46 to effect a funds transfer. Alternatively, the end-user may want to view bank records stored in the memory 48. In any case, the bank is able to confirm the identity of an end-user that is operating the personal computer 50. The following explains how the server 40 confirms the identity. The personal computer 44 of FIG. 5 functions analogously to the server 40/personal computer 50 combination of FIG. 4.

The memory 48 holds instructions that the processor 46 executes, which results in the processor causing an aberration in output that the personal computer 44, 50 provides to the display 54. (In alternate embodiments, a different output device, such as an audio speaker, as discussed above, may be used in place of the display 54.) Examples of aberrations are as discussed above, such as, the disappearance from or a diverted movement on the display 54 of the cursor that the end-user controls using the mouse 58, the disappearance of the cursor that the end-user controls using the keyboard 56, and the display of a character that differs from the character that the end-user specified using the keyboard 56.

When the end-user experiences the aberration, he/she is likely to react accordingly. Such as, if the cursor did not appear on the display where anticipated, he/she would move the mouse 58 is a fashion to move the cursor to the desired position. The end-user's reaction is detected, for example, by client-side software, such as in a JavaScript or flash module of a web browser loaded on the personal computer 50, and the software module or equivalent detection means sends a response based thereon to the server 40, where it is received. (In the embodiment of FIG. 5, a software module of JavaScript, flash, or equivalent detection means on the personal computer 44 transfers a response internal to the personal computer 44 and is handled by the processor 46.)

After the server 40 receives the response, it extracts an end-user characteristic. Then, the server 40 compares this characteristic response with other characteristic responses, which have been stored, for example, in the memory 48 or in other storage, to find similarities that are indicative of the identity of the end-user. (In the embodiment of FIG. 5, a database of characteristic responses may reside on the memory 48 or in another location that is accessible to the processor 46.)

If desired, the server 40 of FIG. 4 and the personal computer 44 of FIG. 5 can repeatedly cause output aberrations throughout a user session to obtain additional identifying information as opposed to the information from only one response to an aberration. Repeatedly causing output aberrations can increase accuracy of and accelerate the user identification procedure as discussed above.

Also shown in FIG. 4 is a representation of a bot 62 that is operationally connected to the network 52. Unauthorized users may attempt to gain access to the server 40 by programming the bot 62 to appear to the server 40 as an authorized end-user operating a personal computer, such as the personal computer 50. The bot 62 includes as functional modules an emulated display 64, an emulated mouse cursor 66, an emulated cursor movement device 68 (such as an emulated mouse), and an emulated keyboard 70, and an emulated cursor 72 that moves according to keystrokes. The purpose of the emulation is appear to the server 40 as a human user when the server 40 sends instructions, such as those intended for an output device like a display, and when the server 40 receives responses, such as those based on user mouse movements and keystrokes. For implementations in which the server 40 expects responses from a JavaScript, flash, or like software module of a web browser, the reactions that the bot 62 emulates are received by the JavaScript module and forwarded to the server 40 for processing.

The bot 62, although programmed to emulate a human end-user as much as possible, may fail to even notice when the server 40 provides an aberration in output. As discussed above with reference to FIG. 3 (see the example of a bot sending "john.smith" in a user name field and an aberration causing an output "joh.ith"), if the bot responds no differently to an aberration than if there were no aberration, suspicion is raised that a bot is attempting to access the server 40.

Accordingly, the memory 48 of the server 40 may hold instructions that, when executed by the processor 46, cause the server 40 to cause an aberration in output that a computer, seemingly like the personal computer 50, provides to an output device, like the display 54. If the server 40 determines that there was no different response to the output aberration, the server 40 may interpret the lack of a different response as indicative that the end-user is a bot. The server 40 may be programmed to execute multiple tests such as this as desired to confirm such suspicions.

In some embodiments of the present invention, the identity of an end-user operating a computer is confirmed by analyzing user reactions to aberrations in output. More specifically, an aberration is caused in output that the computer provides to an output device, and the end-user's response to the aberration is received. An end-user characteristic is extracted from the response and compared to stored characteristic responses to find a match. A match is indicative of the identity of the computer user. It can also be checked whether, after causing an aberration in output the end-user responded differently to the output than if the output did not have the aberration. The lack of a different response can be interpreted as indicative that the end-user is a bot.

Devices, systems, and methods of detecting user identity, differentiating between users of a computerized service, and detecting a cyber-attacker. An end-user device (a desktop computer, a laptop computer, a smartphone, a tablet, or the like) interacts and communicates with a server of a computerized service (a banking website, an electronic commerce website, or the like) or with a local application or Web-browser running on the end-user device. A usage interference is injected or introduced, or an input/output mismatch or abnormality is created, causing an output displayed on the screen of the end-user device, to be non-matching to the expected output that is typically displayed in response to regular non-interfered user gestures or regular non-interfered user input. The reaction or the corrective manual actions of the user are monitored, tracked and analyzed, in order to differentiate among users, or in order to differentiate between an authorized human user and a human cyber-attacker, or in order to differentiate between an authorized human user and a computer bot or an automatic computerized script.

Some embodiments of the present invention may comprise a method of confirming the identity of an end-user operating a computer, the method comprising: a. causing an aberration in output that the computer provides to an output device; b. receiving a response to the aberration; c. extracting from the response an end-user characteristic; and d. comparing the extracted end-user characteristic response with stored characteristic responses to find a match of the end-user's response to a stored response; e. wherein a match is indicative of the identity of the computer user.

In some embodiments, the receiving of the response to the aberration includes receiving at a server the response from the computer.

In some embodiments, the output device is a display for human use or an emulated display for a bot; and the aberration is (1) the disappearance of a cursor from the display, the cursor having moved according to signals from of a cursor movement device, or (2) the disappearance of an emulated cursor from the emulated display, the emulated cursor having moved according to signals from of an emulated cursor movement device.

In some embodiments, wherein the response to the aberration received is generated by the cursor movement device or the emulated cursor movement device.

In some embodiments, the output device is a display for human use or an emulated display for a bot; wherein the aberration is a diverted movement of a cursor on the display or on the emulated display, the diverted movement being a diversion from the movement that the end-user entered via a cursor movement device or via an emulated cursor movement device.

In some embodiments, the response to the aberration received is generated by the cursor movement device or by the emulated cursor movement device.

In some embodiments, the cursor movement is diverted by changing the ratio of the angle and/or magnitude of cursor movement specified by the cursor movement device or by the emulated cursor movement device to the angle and/or magnitude of the movement of the cursor on the display or on the emulated display.

In some embodiments, the output device is a display for human use or an emulated display for a bot, and wherein the aberration is the disappearance of a cursor from the display or an emulated cursor from the emulated display.

In some embodiments the output device is a display for human use or an emulated display for a bot, and wherein the aberration is the display of a character that differs from a character specified for display by the end-user via a keyboard or an emulated keyboard.

In some embodiments the output device is a display for human or an emulated display for a bot, wherein the aberration is undesirable movement of a cursor upon the display, and wherein said step of receiving a response to the aberration comprises receiving end-user cursor movement, wherein said end-user cursor movement is performed using a cursor movement device selected from: a mouse, a trackball, a touch pad, a natural user interface, and a touch-screen display.

In some embodiments, the method may further comprise: repeating the causing of an aberration, the receiving of the response, the extracting of an end-user characteristic, and the comparing of the end-user characteristic response with stored characteristic responses.

In some embodiments, said comparing of the end-user characteristic response with stored characteristic responses comprises plotting a learning curve associated with an end-user.

In some embodiments, said learning curve comprises at least one measurable parameter selected from: the speed of correction for said aberration; an end-user's time for identification of an aberration; continuity of correction for said aberration; mistakes made by said end-user during correction for said aberration; noises in correcting said aberration; and parameters of the efficiency of cursor movement during correction of said aberration.

In some embodiments, a method of confirming the identity of an end-user operating a computer, may comprise: causing an aberration in output that the computer provides to an output device; determining whether the end-user responds differently to the output than if the output did not have the aberration; and interpreting the lack of a different response as indicative that the end-user is a bot.

In some embodiments, a device for confirming the identity of an end-user operating a computer, may comprise: a processor; and a memory holding instructions that, when executed by the processor, cause the processor to: cause an aberration in output that the computer provides to an output device; receive a response to the aberration; extract from the response an end-user characteristic; compare the extracted end-user characteristic response with stored characteristic responses to find a match of the end-user's response to a stored response; wherein a match is indicative of the identity of the end-user.

In some embodiments, the device further comprises: an input unit operative to receive the response to the aberration from the computer through a network.

In some embodiments, the output device is a display for human use or an emulated display for a bot, and wherein the aberration is (1) the disappearance of a cursor from the display, the cursor having moved according to signals from of a cursor movement device, or (2) the disappearance of an emulated cursor from the emulated display, the emulated cursor having moved according to signals from of an emulated cursor movement device.

In some embodiments, the response to the aberration received is generated by the cursor movement device or the emulated cursor movement device.

In some embodiments, the output device is a display for human use or an emulated display for a bot, and wherein the aberration is a diverted movement of a cursor on the display or on the emulated display, the diverted movement being a diversion from the movement that the end-user entered via a cursor movement device or via an emulated cursor movement device.

In some embodiments, the response to the aberration received is generated by the cursor movement device or by the emulated cursor movement device.

In some embodiments, the cursor movement is diverted by changing the ratio of the angle and/or magnitude of cursor movement specified by the cursor movement device or by the emulated cursor movement device to the angle and/or magnitude of the movement of the cursor on the display or on the emulated display.

In some embodiments, the output device is a display for human use or an emulated display for a bot, and wherein the aberration is the disappearance of a cursor from the display or an emulated cursor from the emulated display.

In some embodiments, the output device is a display for human use or an emulated display for a bot, and wherein the aberration is the display of a character that differs from a character specified for display by the end-user.

In some embodiments, the instructions held by the memory, when executed by the processor, further cause the processor to repeat the causing of an aberration, the receiving of the response, the extracting of an end-user characteristic, and the comparing of the end-user characteristic response with stored characteristic responses.

In some embodiments, a device for confirming the identity of an end-user operating a computer, may comprise: a processor; and a memory holding instructions that, when executed by the processor, cause the device to: cause an aberration in output that the computer provides to an output device; determine whether the end-user responds differently to the output than if the output did not have the aberration; interpret the lack of a different response as indicative that the end-user is a bot.

Some embodiments of the present invention may comprise a method of confirming the identity of an end-user interacting with an end-user device; the method comprising: during an interaction session of said end-user, that is performed by said end-user via an input unit of said end-user device, causing an aberration in output that is displayed by an output unit of said end-user device, wherein causing the aberration comprises: modifying input data from the input unit of the end-user device to cause the output unit to display the aberration; receiving from the input unit of the end-user device a response to the displayed aberration; receiving via the input unit of the end-user device, an end-user response to the displayed aberration; extracting from the end-user response a user-specific end-user characteristic that is based on the response of the end-user to said displayed aberration; and comparing between (A) the user-specific end-user characteristic that was extracted from the end-user response to the displayed aberration, and (B) one or more stored characteristic responses that are stored in a database indicating prior responses of the end-user to displayed aberrations; wherein finding a match by said comparing is indicative of the identity of the end-user.

In some embodiments, the receiving of the end-user response to the displayed aberration comprises receiving at a server the end-user response from the end-user device.

In some embodiments, the output unit comprises a display for human use or an emulated display for a bot; wherein the aberration comprises at least one of: (1) disappearance of a cursor from the display, the cursor having moved according to signals from of a cursor movement device, (2) disappearance of an emulated cursor from the emulated display, the emulated cursor having moved according to signals from of an emulated cursor movement device.

In some embodiments, the end-user response to the displayed aberration is generated by the cursor movement device or by the emulated cursor movement device.

In some embodiments, the output unit comprises a display for human use or an emulated display for a bot; wherein the aberration comprises a diverted movement of a cursor on the display or on the emulated display; wherein the diverted movement is a diversion from the movement that the end-user entered via a cursor movement device or via an emulated cursor movement device.

In some embodiments, the end-user response to the displayed aberration is generated by the cursor movement device or by the emulated cursor movement device.

In some embodiments, the cursor movement is diverted by changing one or more of the following: the ratio of the angle of cursor movement displayed, from that specified by said end-user; and/or the magnitude of cursor movement displayed, from that specified by said end-user.

In some embodiments, the output unit comprises a display for human use or an emulated display for a bot; wherein the aberration comprises disappearance of a cursor from the display or disappearance of an emulated cursor from the emulated display.

In some embodiments, causing the aberration comprises causing the output unit to display a character that differs from a character specified for display by the end-user via a keyboard or an emulated keyboard.

In some embodiments, the output unit comprises a display for human or an emulated display for a bot; wherein causing the aberration comprises causing an undesirable movement of a cursor upon the display, and wherein said step of receiving the end-user response to the displayed aberration comprises receiving end-user cursor movement; wherein said end-user cursor movement is performed using a cursor movement device selected from: a mouse, a trackball, a touch pad, a natural user interface, and a touch-screen display.

In some embodiments, the method comprises: repeating a process that comprises the causing of an aberration, the receiving of the end-user response, the extracting of a user-specific end-user characteristic, and the comparing of the extracted user-specific end-user characteristic with stored characteristic responses.

In some embodiments, said comparing of the extracted user-specific end-user characteristic with stored characteristic responses comprises generating a learning curve associated with an end-user's responsiveness to aberrations.

In some embodiments, generating said learning curve comprises generating the learning case by utilizing at least one measurable parameter selected from: the speed of correction for said aberration; an end-user's time for identification of an aberration; continuity of correction for said aberration; mistakes made by said end-user during correction for said aberration; noises in correcting said aberration; and parameters of the efficiency of cursor movement during correction of said aberration.

In some embodiments, a method of confirming the identity of an end-user operating an end-user device, may comprise: causing an on-screen visual aberration in output that the end-user device provides to an output unit of said end-user device; determining whether the end-user responds differently to the output than if the output did not have the on-screen visual aberration; and interpreting the lack of a different response as indicative that the end-user is a bot.

In some embodiments, an apparatus for confirming the identity of an end-user operating an end-user device, may comprise: a processor; and a memory storing instructions that, when executed by the processor, cause the processor to perform a method which comprises: during an interaction session of said end-user, that is performed by said end-user via an input unit of said end-user device, causing an aberration in output that is displayed by an output unit of said end-user device, wherein causing the aberration comprises: modifying input data from the input unit of the end-user device to cause the output unit to display the aberration; receiving from the input unit of the end-user device a response to the displayed aberration; receiving via the input unit of the end-user device, an end-user response to the displayed aberration; and extracting from the end-user response a user-specific end-user characteristic that is based on the response of the end-user to said displayed aberration; and comparing between (A) the user-specific end-user characteristic that was extracted from the end-user response to the displayed aberration, and (B) one or more stored characteristic responses that are stored in a database indicating prior responses of the end-user to displayed aberrations; wherein finding a match by said comparing is indicative of the identity of the end-user.

In some embodiments, the input unit is operative to communicate the end-user response to the displayed aberration through a communication network.

In some embodiments, the output unit is a display for human use or an emulated display for a bot; wherein the aberration comprises at least one of: (1) disappearance of a cursor from the display, the cursor having moved according to signals from of a cursor movement device, (2) disappearance of an emulated cursor from the emulated display, the emulated cursor having moved according to signals from of an emulated cursor movement device.

In some embodiments, the end-user response to the displayed aberration is generated by the cursor movement device or by the emulated cursor movement device.

In some embodiments, the output unit comprises a display for human use or an emulated display for a bot; wherein the aberration comprises a diverted movement of a cursor on the display or on the emulated display, wherein the diverted movement is a diversion from the movement that the end-user entered via a cursor movement device or via an emulated cursor movement device.

In some embodiments, the end-user response to the displayed aberration is generated by the cursor movement device or by the emulated cursor movement device.

In some embodiments, the cursor movement is diverted by changing one or more of the following: the ratio of the angle of cursor movement displayed, from that specified by said end-user; and/or the magnitude of cursor movement displayed, from that specified by said end-user.

In some embodiments, the output unit comprises a display for human use or an emulated display for a bot, wherein the aberration comprises disappearance of a cursor from the display or disappearance of an emulated cursor from the emulated display.

In some embodiments, the output device is a display for human use or an emulated display for a bot, and wherein causing the aberration comprises causing the output unit to display a character that differs from a character specified for display by the end-user via a keyboard or an emulated keyboard.

In some embodiments, the instructions stored by the memory, when executed by the processor, cause the processor to repeat a process that comprises the causing of an aberration, the receiving of the end-user response, the extracting of a user-specific end-user characteristic, and the comparing of the extracted user-specific end-user characteristic with stored characteristic responses.

In some embodiments, an apparatus for confirming the identity of an end-user operating and end-user device, may comprise: a processor; and a memory storing instructions that, when executed by the processor, cause the apparatus to perform a method comprising: causing an on-screen visual aberration in output that the end-user device provides to an output unit of said end-user device; determining whether the end-user responds differently to the output than if the output did not have the on-screen visual aberration; interpreting the lack of a different response as indicative that the end-user is a bot.

Some embodiments of the present invention may comprise a method of confirming the identity of an end-user interacting with an end-user device, the method comprising: (a) during an interaction session of said end-user, that is performed by said end-user via an input unit of said end-user device (e.g., through a mouse, a touch-pad, a touch-screen, a physical keyboard, an on-screen keyboard, or the like), causing (and/or generating, injecting, creating, adding) a usage interference (or an input/output interference, or an input/output mismatch, or an input/output non-correlation, or an input/output mismatch) in the output of said end-user device; wherein causing the usage interference comprises: causing the output unit of said end-user device to display an output that is different from an output that is expected (or intended) to be displayed (e.g., to be normally or regularly displayed) on said output unit in response to non-interfered usage (e.g., regular non-tampered usage that is not subject to the injected usage interference) of said end-user device; (b) receiving from the input unit of the end-user device a response to the interference (e.g., a manual gesture of the user who operates the input unit; a corrective gesture performed through the input unit; or no corrective gesture at all, or no manual response at all); (c) and extracting from the end-user response (if such response exists at all) a user-specific end-user characteristic that is based on the response of the end-user to said interference; (d) comparing between (A) the user-specific end-user characteristic that was extracted from the end-user response to the displayed interference, and (B) one or more stored characteristic responses that are stored in a database indicating prior responses of the end-user to displayed interference; wherein finding a match by said comparing is indicative of the identity of the end-user.

In some embodiments, said comparing is performed (e.g., exclusively, solely, autonomously) within said end-user device. In some embodiments, said comparing is performed (e.g., exclusively, solely, autonomously) at a server computer that is external to and remote from said end-user device. In some embodiments, the comparing is performed in part within the end-user device and in part at the remote server (or at a remote unit that is external to the end-user device).

In some embodiments, causing the usage interference comprises: causing an on-screen cursor, that is displayed on a screen of said end-user-device, and that is moved on-screen in a manner that corresponds to user gestures via said input unit, to disappear from said screen of the end-user device.

In some embodiments, causing the usage interference comprises: causing an on-screen cursor, that is displayed on a screen of said end-user-device, and that is moved on-screen in a manner that corresponds to user gestures via said input unit, to become temporarily stuck and non-moving on said screen of the end-user device even though the input unit of the end-user device receives user gestures that are intended to move said on-screen cursor.

In some embodiments, causing the usage interference comprises: causing an on-screen cursor, that is displayed on a screen of said end-user-device, and that is moved on-screen in a manner that corresponds to user gestures via said input unit, to move on said screen during the usage interference in a manner that does not correspond to user gestures via said input unit.

In some embodiments, causing the usage interference comprises: causing an on-screen cursor, that is displayed on a screen of said end-user-device, and that is moved on-screen in a manner that corresponds to user gestures via said input unit, to move on said screen during the usage interference in a diverted route that is diverted relative to a non-interfered on-screen route that corresponds to user gestures via said input unit.

In some embodiments, causing the usage interference comprises: causing an on-screen cursor, that is displayed on a screen of said end-user-device, and that is moved on-screen in a manner that corresponds to user gestures via said input unit, to move on said screen during the usage interference at a diverted direction, wherein the diverted direction is diverted relative to a non-interfered on-screen direction of cursor movement that corresponds to user gestures via said input unit.

In some embodiments, causing the usage interference comprises: receiving from the input unit of the end-user device, a user gesture performed in a first direction; in response to said user gesture performed in said first direction, causing an on-screen cursor, that is displayed on a screen of said end-user-device, to move to a second, different, direction.

In some embodiments, causing the usage interference comprises: receiving from the input unit of the end-user device, a user gesture performed in a first direction; in response to said user gesture performed in said first direction, causing an on-screen cursor, that is displayed on a screen of said end-user-device, to temporarily disappear from a current on-screen location of the on-screen cursor, and to subsequently reappear at a different on-screen location.

In some embodiments, causing the usage interference comprises: receiving from the input unit of the end-user device, a user gesture performed in a particular direction at a first magnitude; in response to said user gesture performed in said first direction, causing an on-screen cursor, that is displayed on a screen of said end-user-device, to move in said particular direction but at a second, different, magnitude.

In some embodiments, causing the usage interference comprises: receiving from the input unit of the end-user device, an input signal indicating that the user presses a first character in a physical keyboard; in response to said input signal, causing a screen of said end-user device to display a second, different, character at a location of an on-screen cursor of the end-user device, instead of displaying said first character at said location of the on-screen cursor.

In some embodiments, causing the usage interference comprises: receiving from the input unit of the end-user device, an input signal indicating that the user presses a first character in a physical keyboard; in response to said input signal, causing a screen of said end-user device to display two or more characters at a location of an on-screen cursor of the end-user device, instead of displaying said first character at said location of the on-screen cursor.

In some embodiments, causing the usage interference comprises: receiving from the input unit of the end-user device, an input signal indicating that the user presses a first character in a physical keyboard; in response to said input signal, causing a screen of said end-user device to avoid displaying any newly-typed character at a location of an on-screen cursor of said end-user device, instead of displaying said first character at said location of the on-screen cursor.

In some embodiments, causing the usage interference comprises: receiving a signal indicating that the user performed a click through the input unit of the end-user device; introducing an intentional delay period between (A) a first time-point at which said signal is received, and (B) a second time-point at which a screen of the end-user device updates its display to correspond to an effect of said user-performed click; and only after said intentional delay period, updating the display of the output unit to correspond to the effect of said user-performed click.

In some embodiments, causing the usage interference comprises: displaying a first on-screen pointer on the screen of said end-user device, a first on-screen pointer; at a pre-defined time point, which is not in response to a user interaction with the end-user device, replacing the first on-screen pointer with a second, different, on-screen pointer; based on user reaction to said replacing, differentiating among an authorized user and a non-authorized user.

In some embodiments, causing the usage interference comprises: displaying a first on-screen pointer on the screen of said end-user device, a first on-screen pointer that indicates that the end-user device is ready to receive further commands from the user; at a pre-defined time point, which is not in response to a user interaction with the end-user device, replacing the first on-screen pointer with a second, different, on-screen pointer that indicates that the end-user device is currently processing previous commands from the user; based on user reaction to said replacing, differentiating among an authorized user and a non-authorized user.

In some embodiments, the method may comprise: repeating a process that comprises the causing of the usage interference, the receiving of the end-user response, the extracting of a user-specific end-user characteristic, and the comparing of the extracted user-specific end-user characteristic with stored characteristic responses.

In some embodiments, the method may comprise: generating one or more parameter values that indicate a particular learning curve associated with a particular end-user's responsiveness to usage interferences.

In some embodiments, the method may comprise: based on said particular learning curve associated with said particular end-user's responsiveness to usage interferences, differentiating between said particular end-user and another human user.

In some embodiments, the method may comprise: based on said particular learning curve associated with said particular end-user's responsiveness to usage interferences, differentiating between said particular end-user and an automated program that poses as a human user.

In some embodiments, generating the one or more parameter values that indicate the particular learning curve comprises: generating one or more parameter values selected from the group consisting of: a speed of manual correction of said usage interference; a time-period that it takes the end-user to notice said usage interference; a continuity of manual correction of said usage interference; a mistake performed by said end-user during manual correction of said usage interference; estimated efficiency of on-screen cursor movement during manual correction of said usage interference.

In some embodiments, prior to causing the usage interference, the method may comprise: storing a pool of pre-defined usage interferences; pseudo-randomly selecting, from said pool of pre-defined usage interferences, a particular usage interference to be introduced to usage of said end-user device.

In some embodiments, prior to causing the usage interference, the method may comprise: storing a pool of pre-defined usage interferences; pseudo-randomly selecting a particular usage interference to be introduced to usage of said end-user device, from a subset of said pool of pre-defined usage interferences that comprises only usage interferences that were not yet introduced to said end-user device.

In some embodiments, prior to causing the usage interference, the method may comprise: storing a pool of pre-defined usage interferences; non-randomly selecting, based on at least one selection criterion, from said pool of pre-defined usage interferences, a particular usage interference to be introduced to usage of said end-user device.

In some embodiments, prior to causing the usage interference, the method may comprise: storing a pool of pre-defined usage interferences; non-randomly selecting, from said pool of pre-defined usage interferences, a particular usage interference to be introduced to usage of said end-user device, based on estimated efficiency of said particular usage interference in differentiating among users in previous usage sessions of a user account that is currently accessed via said end-user device.

In some embodiments, a method may comprise: determining whether an end-user interacting with an end-user device is either a human user or an automated program, by performing: (a) during an interaction session of said end-user, that is performed by said end-user via an input unit of said end-user device, causing a usage interference in the output of said end-user device, wherein causing the usage interference comprises: causing the output unit of said end-user device to display an output that is different from an output that is expected to be displayed on said output unit in response to non-interfered usage of said end-user device; (b)

checking whether an input unit of said end-user device receives user input indicating corrective gestures that attempt to correct the usage interference; (c) if it is determined that the input unit of said end-user device received, within a pre-defined time-period, user input indicating corrective gestures that attempt to correct the usage interference, then determining that said end-user is a human user; (d) if it is determined that the input unit of said end-user device did not receive, within a pre-defined time-period, user input indicating corrective gestures that attempt to correct the usage interference, then determining that said end-user is an automated program.

In some embodiments, the above-mentioned steps, or all or some of them, may be performed by one or more suitable modules that may be located at the end-user device and/or at a remote server (e.g., that serves to the end-user device the computerized service or the web-pages that are being utilized by the end-user). Such modules or units may be implemented by using suitable hardware components and/or software components; and may be implemented by using, or may comprise, for example: a user-response recording module; a user-response tracking module; a user-response monitoring module; a user-response analysis module; a user-response feature-extractor module; an interference generator; an interference modifier (e.g., able to modify or set one or more parameters of an interference of a particular type); a pool or bank of pre-defined interference types; an interference selector (e.g., able to select an interference out of said pool or bank, based on pseudo-random parameters, or based on time/date or location-based parameters, or based on history of interferences that were successfully used with this particular user and/or with other users, or based on history of interferences that were unsuccessfully used with this particular user and/or with other users, or based on history of interferences that were not yet used with this particular user and/or with other users); an interference combination module (e.g., able to combine together, and display or produce, a combination of two-or-more pre-defined usage interference; such as, for example, the on-screen pointer is diverted from its planned on-screen travel path, and also the on-screen pointer is replaced from a regular arrow-shaped pointer to a "computer is thinking/processing" hour-glass shaped pointer); a pointer disappearance module; a cursor disappearance module; a pointer-is-stuck module; a cursor-is-stuck module; a physical keyboard interference module; an on-screen keyboard interference module; a mouse-input interference module; a touchpad-input interference module; a touch-screen interference module; a screen-gesture or screen-swipe interference module; a replacer module able to replace an intended input with abnormal or other on-screen effect; a diverter module able to divert or move or off-set the location in which, on the screen, an input appears or a pointer or cursor appears, off-set or diverted relative to its planned or intended or expected or regular (non-interfered) location or path; a click interference module, or a tap interference module, able to interfere with the on-screen effects of a click or a tap or other user input that indicates user selection; and/or other suitable modules or units.

In accordance with the present invention, the terms "aberration" or "interference" or "on-screen interference" or "abnormality" or similar terms, may comprise: any suitable step or steps that cause an end-user device (e.g., computer, tablet, smartphone, or the like) to behave in a manner that differs from a regular manner or standard manner or expected manner or intended manner or non-interfered manner; or to behave in a manner such that the output unit (e.g., screen) displays data, or displays one or more features (e.g., mouse-pointer, text-pointer, typed text, or the like) in a manner that does not correspond to intended or expected display that is typically or normally produced (or updated, or displayed) based on the user's gestures or input or interactions via the input unit (e.g., via a mouse, a touch-screen, a touchpad, a physical keyboard, a virtual keyboard, or the like).

In accordance with the present invention, the terms "cursor" or "pointer" may comprise any suitable on-screen pointer or on-screen cursor, which may correspond to a current location that is pointed-to by one or more input units, such as, a mouse, a trackball, a touchpad, a physical keyboard, a virtual keyboard, or the like.

In accordance with the present invention, an interference may be generated or injected into the output that is displayed on the screen of the end-user device, in a manner that is entirely unrelated to the specific application or website or computerized service that is being visited or utilized by the user; and/or in a manner that is unrelated to, and non-dependent on, the particular interface or interface-components or GUI-elements of the particular application or browser or web-site or service; but rather, by injecting or generating an interference that creates a situation in which the user expects to see Output A on the screen, but sees actually Output B on the screen, at least temporarily and/or until the user performs a manual corrective gesture through the input unit.

The present invention may differentiate or distinguish between the genuine (human) user, and a robot or a machine-operable module or function (e.g., implemented as a computer virus, a Trojan module, a cyber-weapon, or other malware) which attempts to automatically imitate or emulate or simulate movement of a cursor or other interaction with a touch-screen. For example, false identity created by automated malware may be detected by the present invention as such automated malware may lack the characterization of human (e.g., the manual activity having the particular user-specific traits, as described above).

The present invention may operate and may provide an efficient biometric or user-authentication modality, without capturing, storing, or otherwise identifying any Personally Identifiable Information (PII). For example, the present invention may be used to distinguish between a genuine user and a fraudster, without knowing any PPI of the genuine user and/or of the fraudster.

Some embodiments of the present invention may be implemented, for example, as a built-in or integrated security feature which may be a component or a module of a system or device, or may be a downloadable or install-able application or module, or plug-in or extension; or as a module of a web-site or web-page, or of a client-server system or a "cloud computing" system; or as machine-readable medium or article or memory unit able to store instructions and/or code which, when executed by the mobile device or by other suitable machine (e.g., a remote server, or a processor or a computer) cause such machine to perform the method(s) and/or operations described herein. Some units, components or modules, may be implemented externally to the user device, may be implemented in a remote server, a web server, a website or webpage, a "cloud computing" server or database, a client/server system, a distributed system, a peer-to-peer network or system, or the like.

The present invention may be used in conjunction with various suitable devices and systems, for example, various devices that have a touch-screen; a smart-watch; a wearable or portable electronic device; an ATM; a kiosk machine or vending machine that has a touch-screen; a touch-keyboard; a system that utilizes Augmented Reality (AR) components or AR glasses (e.g., Google Glass); other suitable AR device or AR glasses or AR helmet or AR headgear; a device or system that may detect hovering gestures that do not necessarily touch on the screen or touch-screen; a hovering screen; a system or device that utilize brainwave analysis or brainwave control in which the user's brainwaves are captured or read and the user's brain may directly control an application on the mobile device; and/or other suitable devices or systems.

Modules, elements, systems and/or sub-systems described herein may be implemented by using hardware components and/or software modules; for example, utilizing a processor, a controller, an Integrated Circuit (IC), a logic unit, memory unit, storage unit, input unit, output unit, wireless modem or transceiver, wired modem or transceiver, internal or external power source, database or data repository, Operating System (OS), drivers, software applications, or the like. Some embodiments may utilize client/server architecture, distributed architecture, peer-to-peer architecture, and/or other suitable architectures; as well as one or more wired and/or wireless communication protocols, links and/or networks.

Although portions of the discussion herein relate, for demonstrative purposes, to wired links and/or wired communications, some embodiments of the present invention are not limited in this regard, and may include one or more wired or wireless links, may utilize one or more components of wireless communication, may utilize one or more methods or protocols of wireless communication, or the like. Some embodiments may utilize wired communication and/or wireless communication.

Functions, operations, components and/or features described herein with reference to one or more embodiments of the present invention, may be combined with, or may be utilized in combination with, one or more other functions, operations, components and/or features described herein with reference to one or more other embodiments of the present invention.

While certain features of the present invention have been illustrated and described herein, many modifications, substitutions, changes, and equivalents may occur to those skilled in the art. Accordingly, the claims are intended to cover all such modifications, substitutions, changes, and equivalents.

What is claimed is:

1. A method of confirming the identity of an end-user interacting with an end-user device, the method comprising:
    (a) during an interaction session of said end-user, that is performed by said end-user via an input unit of said end-user device, causing a usage interference in the output of said end-user device,
        wherein causing the usage interference comprises: causing the output unit of said end-user device to display an output that is different from an output that is expected to be displayed on said output unit in response to non-interfered usage of said end-user device;
    (b) receiving from the input unit of the end-user device a response to the interference;
    (c) receiving via the input unit of the end-user device, an end-user response to the interference; and extracting from the end-user response a user-specific end-user characteristic that is based on the response of the end-user to said interference;
    (d) comparing between (A) the user-specific end-user characteristic that was extracted from the end-user response to the displayed interference, and (B) one or more stored characteristic responses that are stored in a database indicating prior responses of the end-user to displayed interference,
        wherein finding a match by said comparing is indicative of the identity of the end-user;
        wherein, prior to causing the usage interference, the method comprises:
        storing a pool of pre-defined usage interferences;
        non-randomly selecting, from said pool of pre-defined usage interferences, a particular usage interference to be introduced to usage of said end-user device, based on estimated efficiency of said particular usage interference in differentiating among users in previous usage sessions of a user account that is currently accessed via said end-user device.

2. The method of claim 1, wherein said comparing is performed within said end-user device.

3. The method of claim 1, wherein said comparing is performed at a server computer that is external to and remote from said end-user device.

4. The method of claim 1, wherein causing the usage interference comprises:
    causing an on-screen cursor, that is displayed on a screen of said end-user-device, and that is moved on-screen in a manner that corresponds to user gestures via said input unit, to disappear from said screen of the end-user device.

5. The method of claim 1, wherein causing the usage interference comprises:
    causing an on-screen cursor, that is displayed on a screen of said end-user-device, and that is moved on-screen in a manner that corresponds to user gestures via said input unit, to become temporarily stuck and non-moving on said screen of the end-user device even though the input unit of the end-user device receives user gestures that are intended to move said on-screen cursor.

6. The method of claim 1, wherein causing the usage interference comprises:
    causing an on-screen cursor, that is displayed on a screen of said end-user-device, and that is moved on-screen in a manner that corresponds to user gestures via said input unit, to move on said screen during the usage interference in a manner that does not correspond to user gestures via said input unit.

7. The method of claim 1, wherein causing the usage interference comprises:
    causing an on-screen cursor, that is displayed on a screen of said end-user-device, and that is moved on-screen in a manner that corresponds to user gestures via said input unit, to move on said screen during the usage interference in a diverted route that is diverted relative to a non-interfered on-screen route that corresponds to user gestures via said input unit.

8. The method of claim 1, wherein causing the usage interference comprises:
    causing an on-screen cursor, that is displayed on a screen of said end-user-device, and that is moved on-screen in a manner that corresponds to user gestures via said input unit, to move on said screen during the usage interference at a diverted direction, wherein the diverted direction is diverted relative to a non-interfered on-screen direction of cursor movement that corresponds to user gestures via said input unit.

9. The method of claim 1, wherein causing the usage interference comprises:
receiving from the input unit of the end-user device, a user gesture performed in a first direction;
in response to said user gesture performed in said first direction, causing an on-screen cursor, that is displayed on a screen of said end-user-device, to move to a second, different, direction.

10. The method of claim 1, wherein causing the usage interference comprises:
receiving from the input unit of the end-user device, a user gesture performed in a first direction;
in response to said user gesture performed in said first direction, causing an on-screen cursor, that is displayed on a screen of said end-user-device, to temporarily disappear from a current on-screen location of the on-screen cursor, and to subsequently reappear at a different on-screen location.

11. The method of claim 1, wherein causing the usage interference comprises:
receiving from the input unit of the end-user device, a user gesture performed in a particular direction at a first magnitude;
in response to said user gesture performed in said first direction, causing an on-screen cursor, that is displayed on a screen of said end-user-device, to move in said particular direction but at a second, different, magnitude.

12. The method of claim 1, wherein causing the usage interference comprises:
receiving from the input unit of the end-user device, an input signal indicating that the user presses a first character in a physical keyboard;
in response to said input signal, causing a screen of said end-user device to display a second, different, character at a location of an on-screen cursor of the end-user device, instead of displaying said first character at said location of the on-screen cursor.

13. The method of claim 1, wherein causing the usage interference comprises:
receiving a signal indicating that the user performed a click through the input unit of the end-user device;
introducing an intentional delay period between (A) a first time-point at which said signal is received, and (B) a second time-point at which a screen of the end-user device updates its display to correspond to an effect of said user-performed click;
only after said intentional delay period, updating the display of the output unit to correspond to the effect of said user-performed click.

14. The method of claim 1, wherein causing the usage interference comprises:
displaying a first on-screen pointer on the screen of said end-user device, a first on-screen pointer;
at a pre-defined time point, which is not in response to a user interaction with the end-user device, replacing the first on-screen pointer with a second, different, on-screen pointer;
based on user reaction to said replacing, differentiating among an authorized user and a non-authorized user.

15. The method of claim 1, further comprising:
repeating a process that comprises the causing of the usage interference, the receiving of the end-user response, the extracting of a user-specific end-user characteristic, and the comparing of the extracted user-specific end-user characteristic with stored characteristic responses.

16. The method of claim 1, comprising:
generating one or more parameter values that indicate a particular learning curve associated with a particular end-user's responsiveness to usage interferences.

17. The method of claim 16, comprising:
based on said particular learning curve associated with said particular end-user's responsiveness to usage interferences, differentiating between said particular end-user and another human user.

18. The method of claim 16, comprising:
based on said particular learning curve associated with said particular end-user's responsiveness to usage interferences, differentiating between said particular end-user and an automated program that poses as a human user.

19. The method of claim 16, wherein generating the one or more parameter values that indicate the particular learning curve comprises:
generating one or more parameter values selected from the group consisting of:
a speed of manual correction of said usage interference;
a time-period that it takes the end-user to notice said usage interference;
a continuity of manual correction of said usage interference;
a mistake performed by said end-user during manual correction of said usage interference;
estimated efficiency of on-screen cursor movement during manual correction of said usage interference.

20. A method of confirming the identity of an end-user interacting with an end-user device, the method comprising:
(a) during an interaction session of said end-user, that is performed by said end-user via an input unit of said end-user device, causing a usage interference in the output of said end-user device,
wherein causing the usage interference comprises:
causing the output unit of said end-user device to display an output that is different from an output that is expected to be displayed on said output unit in response to non-interfered usage of said end-user device;
(b) receiving from the input unit of the end-user device a response to the interference;
(c) receiving via the input unit of the end-user device, an end-user response to the interference; and extracting from the end-user response a user-specific end-user characteristic that is based on the response of the end-user to said interference;
(d) comparing between (A) the user-specific end-user characteristic that was extracted from the end-user response to the displayed interference, and (B) one or more stored characteristic responses that are stored in a database indicating prior responses of the end-user to displayed interference,
wherein finding a match by said comparing is indicative of the identity of the end-user;
wherein causing the usage interference comprises:
receiving from the input unit of the end-user device, an input signal indicating that the user presses a first character in a physical keyboard;
in response to said input signal, causing a screen of said end-user device to display two or more characters at a location of an on-screen cursor of the end-user device, instead of displaying said first character at said location of the on-screen cursor.

21. The method of claim 20, wherein, prior to causing the usage interference, the method comprises:

storing a pool of pre-defined usage interferences;
pseudo-randomly selecting, from said pool of pre-defined usage interferences, a particular usage interference to be introduced to usage of said end-user device.

22. A method of confirming the identity of an end-user interacting with an end-user device, the method comprising:
(a) during an interaction session of said end-user, that is performed by said end-user via an input unit of said end-user device, causing a usage interference in the output of said end-user device,
wherein causing the usage interference comprises: causing the output unit of said end-user device to display an output that is different from an output that is expected to be displayed on said output unit in response to non-interfered usage of said end-user device;
(b) receiving from the input unit of the end-user device a response to the interference;
(c) receiving via the input unit of the end-user device, an end-user response to the interference; and extracting from the end-user response a user-specific end-user characteristic that is based on the response of the end-user to said interference;
(d) comparing between (A) the user-specific end-user characteristic that was extracted from the end-user response to the displayed interference, and (B) one or more stored characteristic responses that are stored in a database indicating prior responses of the end-user to displayed interference,
wherein finding a match by said comparing is indicative of the identity of the end-user;
wherein causing the usage interference comprises:
receiving from the input unit of the end-user device, an input signal indicating that the user presses a first character in a physical keyboard;
in response to said input signal, causing a screen of said end-user device to avoid displaying any newly-typed character at a location of an on-screen cursor of said end-user device, instead of displaying said first character at said location of the on-screen cursor.

23. The method of claim 22, wherein, prior to causing the usage interference, the method comprises:
storing a pool of pre-defined usage interferences;
pseudo-randomly selecting a particular usage interference to be introduced to usage of said end-user device, from a subset of said pool of pre-defined usage interferences that comprises only usage interferences that were not yet introduced to said end-user device.

24. A method of confirming the identity of an end-user interacting with an end-user device, the method comprising:
(a) during an interaction session of said end-user, that is performed by said end-user via an input unit of said end-user device, causing a usage interference in the output of said end-user device,
wherein causing the usage interference comprises: causing the output unit of said end-user device to display an output that is different from an output that is expected to be displayed on said output unit in response to non-interfered usage of said end-user device;
(b) receiving from the input unit of the end-user device a response to the interference;
(c) receiving via the input unit of the end-user device, an end-user response to the interference; and extracting from the end-user response a user-specific end-user characteristic that is based on the response of the end-user to said interference;
(d) comparing between (A) the user-specific end-user characteristic that was extracted from the end-user response to the displayed interference, and (B) one or more stored characteristic responses that are stored in a database indicating prior responses of the end-user to displayed interference,
wherein finding a match by said comparing is indicative of the identity of the end-user;
wherein causing the usage interference comprises:
displaying a first on-screen pointer on the screen of said end-user device, a first on-screen pointer that indicates that the end-user device is ready to receive further commands from the user;
at a pre-defined time point, which is not in response to a user interaction with the end-user device, replacing the first on-screen pointer with a second, different, on-screen pointer that indicates that the end-user device is currently processing previous commands from the user;
based on user reaction to said replacing, differentiating among an authorized user and a non-authorized user.

25. The method of claim 24, wherein, prior to causing the usage interference, the method comprises:
storing a pool of pre-defined usage interferences;
non-randomly selecting, based on at least one selection criterion, from said pool of pre-defined usage interferences, a particular usage interference to be introduced to usage of said end-user device.

* * * * *